(12) United States Patent
Zavattari et al.

(10) Patent No.: US 7,223,344 B2
(45) Date of Patent: May 29, 2007

(54) METHOD FOR TREATING AN EXHAUSTED GLYCOL-BASED SLURRY

(75) Inventors: Carlo Zavattari, Varallo Pombia (IT); Guido Fragiacomo, Novara (IT); Elio Portaluppi, Novara (IT)

(73) Assignee: MEMC Electronic Materials, SpA, Novara (IT)

( * ) Notice: Subject to any disclaimer, the term of this patent is extended or adjusted under 35 U.S.C. 154(b) by 381 days.

(21) Appl. No.: 10/479,301

(22) PCT Filed: May 29, 2001

(86) PCT No.: PCT/IT01/00276

§ 371 (c)(1),
(2), (4) Date: Mar. 23, 2004

(87) PCT Pub. No.: WO02/096611

PCT Pub. Date: Dec. 5, 2002

(65) Prior Publication Data

US 2004/0144722 A1 Jul. 29, 2004

(51) Int. Cl.
- B01D 11/02 (2006.01)
- C02F 103/00 (2006.01)
- B24B 1/00 (2006.01)

(52) U.S. Cl. .................. 210/634; 210/767; 210/772; 210/774; 210/788; 210/805; 438/460; 451/36; 451/60

(58) Field of Classification Search ............. 210/634, 210/639, 649, 767–774, 787, 788, 805, 806; 451/36, 60, 446; 241/20, 21; 209/155, 725; 438/460

See application file for complete search history.

(56) References Cited

U.S. PATENT DOCUMENTS

| | | | |
|---|---|---|---|
| 4,751,006 A | | 6/1988 | Becker |
| 5,664,990 A | | 9/1997 | Adams et al. |
| 5,799,643 A | * | 9/1998 | Miyata et al. ............ 125/21 |
| 5,947,102 A | | 9/1999 | Knepprath et al. |
| 6,183,352 B1 | * | 2/2001 | Kurisawa ................ 451/87 |
| 6,322,710 B1 | * | 11/2001 | Katsumata et al. ........ 210/740 |
| 6,615,817 B2 | * | 9/2003 | Horio ..................... 451/87 |

FOREIGN PATENT DOCUMENTS

| | | |
|---|---|---|
| EP | 0 147 541 | 7/1985 |
| EP | 0 515 011 | 11/1992 |

(Continued)

OTHER PUBLICATIONS

PCT International Search Report dated Feb. 8, 2002.

(Continued)

*Primary Examiner*—Joseph Drodge
(74) *Attorney, Agent, or Firm*—Senniger Powers

(57) ABSTRACT

A method of separating, recovering and reusing components of an exhausted slurry used in slicing silicon wafers from a silicon ingot. In the method, the solid particles and lubricating fluid of the exhausted slurry are separated without decreasing the viscosity of the exhausted slurry. The separated lubricating fluid may be collected and reused in the preparation of a fresh slurry. Additionally, the silicon particulate and metal slicing wire particulate are dissolved and separated from the abrasive grains. The abrasive grains are separated into spent abrasive grains and unspent abrasive grains. The separated unspent abrasive grains are suitable for reuse in the preparation of a fresh slurry.

31 Claims, 3 Drawing Sheets

FOREIGN PATENT DOCUMENTS

| | | |
|---|---|---|
| EP | 0 786 317 A2 | 7/1997 |
| EP | 0 791 385 A1 | 8/1997 |
| EP | 0 986 801 A1 | 1/2000 |
| GB | 1 083 479 | 9/1967 |
| GB | 2 017 517 A | 10/1979 |
| JP | 09 285 967 | 11/1997 |
| JP | 11 012 562 | 1/1999 |
| JP | 11 147 713 | 6/1999 |
| JP | 11 319 755 | 11/1999 |
| WO | WO 00 1519 | 1/2000 |
| WO | WO 02 096 611 | 12/2002 |

OTHER PUBLICATIONS

PCT International Preliminary Examination Report dated Apr. 9, 2003.

European Search Report, Jun. 17, 2005, 3 pages.

\* cited by examiner

METHOD FOR TREATING AN EXHAUSTED GLYCOL-BASED SLURRY

BACKGROUND OF THE INVENTION

The present invention relates generally to a method for the regeneration of an abrasive slurry utilized in the preparation of silicon wafers. More particularly, the present invention relates to a method of separating components of an exhausted slurry, used in slicing wafers from a single crystal or polycrystalline silicon ingot, such that the desirable abrasive grains and lubricating, or cooling, fluid therein may be reused.

Silicon wafers are obtained from a single crystal or polycrystalline silicon ingot by first slicing the ingot in a direction normal to its axis. Typically, the slicing operation is accomplished by means of a wire saw, wherein the silicon ingot is contacted with a reciprocating wire while a slurry containing abrasive grains is supplied to the contact area between the ingot and the wire. Conventional wire saw slurries typically comprise a lubricating, or cooling fluid, such as, for example, mineral oil or some water soluble liquid (e.g., polyethylene glycol, or "PEG"), and abrasive grains, such as silicon carbide.

During the slicing operation, silicon particulate from the ingot and metal particulate (primarily iron) from the slicing wire and metal pipes form and are incorporated into the slurry. As the concentrations of the silicon and metal particulate in the slurry increase, the efficiency of the slicing operation decreases. Eventually, the slurry becomes ineffective, or "exhausted," and must be discarded. Typically, the exhausted slurry is disposed of by incineration or treated by a waste water treatment facility. However, burning this slurry generates carbon dioxide and sending this slurry to a waste water treatment facility typically results in the formation of a sludge which must be disposed of in a landfill. Accordingly, both approaches of disposal are unfavorable from an environmental point of view. It is therefore desirable to eliminate, or significantly reduce the amount of, this waste which is generated.

In addition to the negative environmental consequences and the costs associated with the disposal of the exhausted slurry, silicon wafer production costs are also increased due to the fact that the slurry is generally disposed of prematurely. More specifically, the rate at which the abrasive grains in the slurry are "spent" (i.e., worn to a size too small for effective slicing) by the slicing operation is generally much less than the rate at which the slurry becomes contaminated by silicon and metal particulate. Furthermore, the useful life of a typical lubricating or cooling fluid is dictated almost entirely by the build-up of silicon and/or metal particulate; that is, the lubricating or cooling solution could be used for a much longer period of time, if it were not for the increasing concentration of silicon and metal particulate in the slurry. As a result, the slurry is typically discarded once the level of silicon and/or metal particulate in the slurry is too high, even though much of the abrasive grains and lubricating fluid are still usable.

In view of the foregoing, a need continues to exist for a method which may be utilized to separate silicon and metal wire particulate from the slurry, thus enabling the reuse of abrasive grains and the lubricating fluid. Such a process would reduce the manufacturing costs associated with the slicing of silicon ingots. In addition, such a process would reduce the amount of waste product and/or waste byproduct emitted into the environment.

SUMMARY OF THE INVENTION

Among the several objects and features of the present invention may be noted the provision of a method for extending the useful life of the components of a slurry utilized in slicing a silicon ingot; the provision of such a method wherein these components are regenerated by separating them from an exhausted slurry; the provision of such a method wherein the lubricating fluid may be efficiently regenerated by separating it from solids in the slurry; the provision of such a method wherein unspent abrasive grains may be regenerated by separating them from spent abrasive grains, silicon particulate and metal particulate; the provision of such a method wherein the regenerated lubricating fluid and the regenerated abrasive grains are reintroduced into the silicon wafer manufacturing process; the provision of such a method wherein the liquid (such as water) used in the separation of solids is reused; the provision of such a method wherein the separated spent abrasive grains may be reused (e.g., in the manufacture of grinding wheels or cement); the provision of such a method wherein the soluble silicon salt byproduct and the etchants used in the method are reused (e.g., in the preparation of industrial soaps); the provision of such a method wherein the amount of waste which must be discarded is decreased or eliminated; and, the provision of such a method wherein the cost of producing silicon wafers is reduced.

Briefly, therefore, the present invention is directed to a method for treating an exhausted slurry utilized in slicing silicon wafers from a silicon ingot, the exhausted slurry comprising a lubricating fluid, unspent abrasive grains, spent abrasive grains, silicon particulate and metal particulate. The exhausted slurry is separated into a first liquid fraction and a first solids fraction, the first liquid fraction comprising lubricating fluid, the first solids fraction comprising unspent abrasive grains, spent abrasive grains, silicon particulate and metal particulate. The first solids fraction is mixed with a first etchant to form a first solid/etchant mixture in which at least one of the group consisting of silicon particulate and metal particulate is dissolved.

In another embodiment the exhausted slurry is separated into a first liquid fraction and a first solids fraction, the first liquid fraction comprising lubricating fluid suitable for direct incorporation into a fresh slurry, the first solids fraction comprising unspent abrasive grains, spent abrasive grains, silicon particulate and metal particulate. The first solids fraction is mixed with water to form an aqueous suspension comprising unspent abrasive grains, spent abrasive grains, silicon particulate and metal particulate. The aqueous suspension is separated into a recycle fraction and waste fraction, the recycle fraction comprising unspent abrasive grains, silicon particulate, metal particulate and water, the waste fraction comprising spent abrasive grains, silicon particulate, metal particulate and water. The water is separated from the recycle fraction and then the recycle fraction is mixed with a first etchant to form a first solid/etchant mixture in which the silicon particulate or the metal particulate is dissolved. The first solid/etchant mixture is separated into a second liquid fraction and a second solids fraction, the second liquid fraction comprising the first etchant and dissolved silicon particulate or dissolved metal particulate, the second solids fraction comprising unspent abrasive grains and silicon particulate or metal particulate not dissolved in the first etchant. The second solids fraction is mixed with a second etchant to form a second solid/etchant mixture in which the silicon particulate or the metal particulate is dissolved. The second solid/etchant mixture is separated into a third liquid fraction and a third solids fraction, the third liquid fraction comprising the second etchant and dissolved silicon particulate or dissolved metal particulate, the third solids fraction comprising unspent abrasive grains suitable for direct incorporation into a fresh slurry.

In a further embodiment the exhausted slurry is separated into a first liquid fraction and a first solids fraction, the first liquid fraction comprising lubricating fluid, the first solids fraction comprising unspent abrasive grains, spent abrasive grains, silicon particulate, metal particulate and lubricating fluid. The first solids fraction is washed with a solvent to reduce the concentration of lubricating fluid in the first solids fraction and form a wash liquor comprising solvent and lubricating fluid. The wash liquor is added to the first liquid fraction and the first liquid fraction is heated to a temperature ranging from about 50° C. to about 100° C. to evaporate the solvent until the first liquid fraction is suitable for direct incorporation into a fresh slurry. The washed first solids fraction is mixed with an aqueous sodium hydroxide solution to form a first solid/etchant mixture in which the silicon particulate is dissolved. The first solid/etchant mixture is separated into a second liquid fraction and a second solids fraction, the second liquid fraction comprising the aqueous sodium hydroxide solution and dissolved silicon particulate; the second solids fraction comprising unspent abrasive grains, spent abrasive grains and metal particulate. The second solids fraction is mixed with an aqueous sulfuric acid solution to form a second solid/etchant mixture in which the metal particulate is dissolved. The second solid/etchant mixture is separated into a third liquid fraction and a third solids fraction, the third liquid fraction comprising the aqueous sulfuric acid solution and dissolved metal particulate, the third solids fraction comprising unspent abrasive grains and spent abrasive grains. The third solids fraction is rinsed with water and then dried until the water content is less than about 1000 ppm, the dried third solids fraction being suitable for direct incorporation into a fresh slurry provided the concentration of spent abrasive grains is less than about 7 percent by weight of the third solids fraction.

In a preferred embodiment the exhausted slurry is separated into a first liquid fraction and a first solids fraction, the first liquid fraction comprising lubricating fluid, the first solids fraction comprising unspent abrasive grains, spent abrasive grains, silicon particulate, metal particulate and lubricating fluid. The first solids fraction is washed with a solvent to reduce the concentration of lubricating fluid in the first solids fraction and form a wash liquor comprising solvent and lubricating fluid. The wash liquor is added to the first liquid fraction and the first liquid fraction is heated to a temperature ranging from about 50° C. to about 100° C. to evaporate the solvent until the first liquid fraction is suitable for direct incorporation into a fresh slurry. The washed first solids fraction is mixed with an aqueous sodium hydroxide solution to form a first solid/etchant mixture in which the silicon particulate is dissolved. The first solid/etchant mixture is separated into a second liquid fraction and a second solids fraction, the second liquid fraction comprising the aqueous sodium hydroxide solution and dissolved silicon particulate; the second solids fraction comprising unspent abrasive grains, spent abrasive grains and metal particulate. The second solids fraction is mixed with an aqueous sulfuric acid solution to form a second solid/etchant mixture in which the metal particulate is dissolved. The second solid/etchant mixture is separated into a third liquid fraction and a third solids fraction, the third liquid fraction comprising the aqueous sulfuric acid solution and dissolved metal particulate, the third solids fraction comprising unspent abrasive grains and spent abrasive grains. The third solids fraction is mixed with water to form an aqueous suspension comprising unspent abrasive grains and spent abrasive grains. The aqueous suspension is separated into a recycle fraction and waste fraction, the recycle fraction comprising unspent abrasive grains and water, the waste fraction comprising spent abrasive grains and water. The recycle fraction is separated into a reusable suspending liquid and isolated unspent abrasive grains. The isolated unspent abrasive grains are dried until the water content is less than about 1000 ppm, the dried isolated unspent abrasive grains being suitable for direct incorporation into a fresh slurry.

Other objects and features of the present invention will be in part apparent and in part pointed out hereinafter.

BRIEF DESCRIPTION OF THE DRAWING

FIG. 1 is directed to the separation and recovery of lubricating fluid.

FIG. 2 is directed to the separation of silicon and metal particulate.

FIG. 3 is directed to the separation and recovery of silicon carbide abrasive grains.

DETAILED DESCRIPTION OF THE INVENTION

In order to reduce the amount of waste generated by standard silicon wafer production processes, as well as reduce the costs associated with silicon wafer production in general, it is desirable to regenerate or recycle the exhausted abrasive slurry used to slice the silicon ingots into wafers. More specifically, it is desirable to isolate those components of the slurry which are still suitable for purposes of slicing an ingot (i.e., the lubricating fluid and the unspent abrasive grains) from the remainder of the slurry and use the isolated desirable components to prepare fresh slurries. The components of the exhausted abrasive slurry not reused to prepare fresh slurries (i.e., the spent abrasive grains, the silicon particulate and the metal particulate) may be used in other applications.

As used herein, "exhausted slurry" refers to a slurry which is essentially no longer suitable for purposes of slicing silicon wafers from a silicon ingot as a result of, for example, an unacceptably high content of silicon and/or metal particulate that hinders the slicing operation. It is presently believed that silicon particulate hinders a silicon ingot slicing operation at concentrations above about 1–5% by weight, preferably above about 3% by weight of the solid matter in the slicing slurry. It is also believed that metal particulate hinders the slicing operation at concentrations about about 0.5–2%, preferably above about 1% by weight. "Spent abrasive grains" refers to abrasive grains which, as a result of being worn down by the slicing process, are of a diameter or size which is generally no longer suitable for purposes of slicing silicon wafers from a silicon ingot. It is presently believed that abrasive grains are spent at less than about 1 µm in size. "Unspent abrasive grains" refers to abrasive grains in the exhausted slurry which are still suitable for purposes of slicing silicon wafers from a silicon ingot (presently believed to be greater than about 1 µm in size). It is presently believed that the spent abrasive grains hinder a silicon ingot slicing operation at concentrations above about 5–10%, and preferably above about 7%, by weight of the total abrasive grains (i.e., spent and unspent abrasive grains). "Viscosity" refers to the dynamic viscosity of the slurry, which is the viscosity as determined or measured while the slurry is in flow, by means common in the art.

The method of the present invention separates waste solids (i.e., silicon particulate, metal particulate and spent abrasive grains) from those slurry components which may be reused (i.e., lubricating fluid and unspent abrasive grains) by (1) segregating the suspended solids and lubricating fluid, (2) segregating the abrasive grains (spent and unspent) and the silicon and metal particulate and (3) segregating the spent and unspent abrasive grains.

A. Segregation of Suspended Solids and Lubricating Fluid

Figure 1:
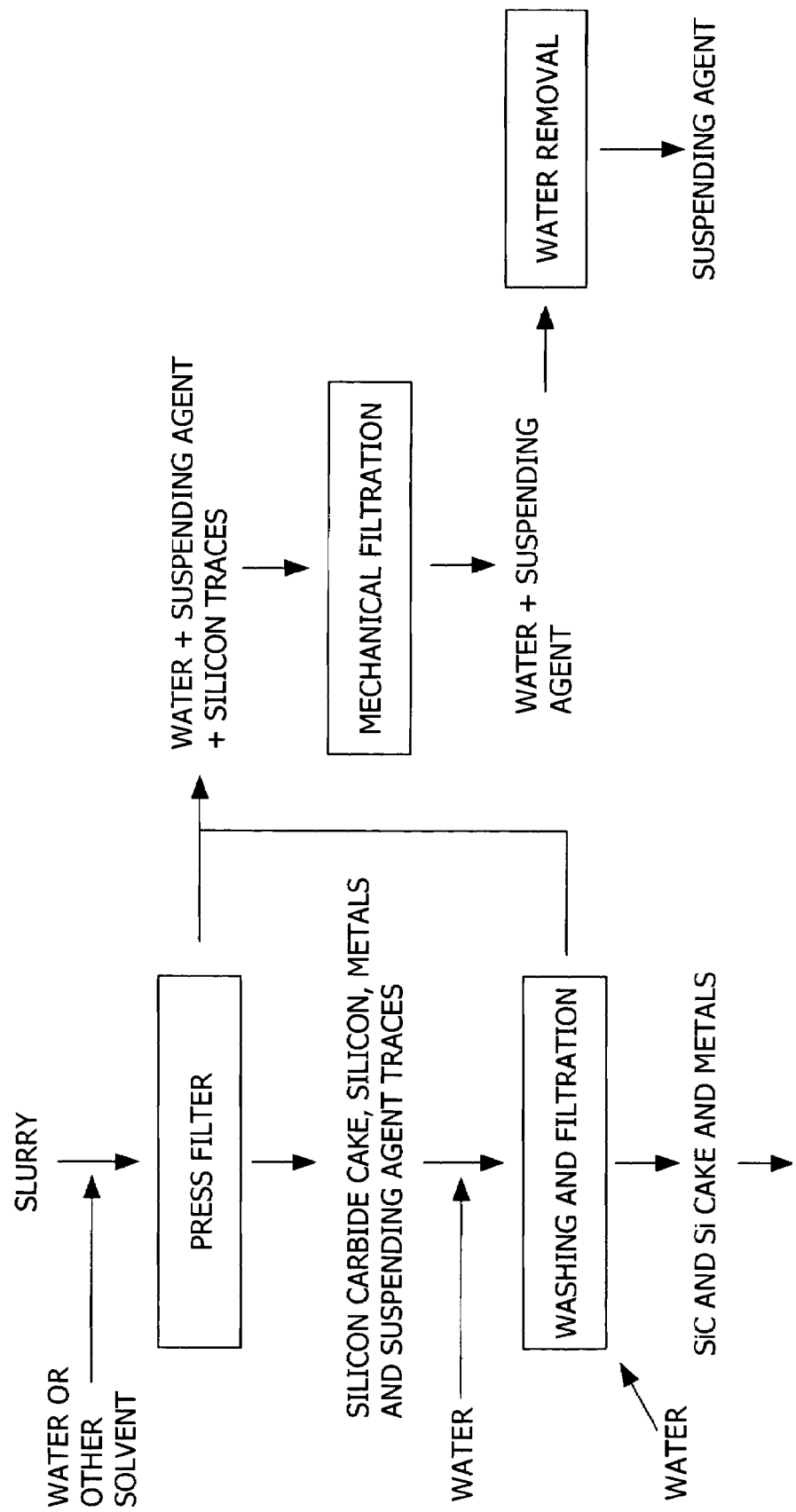
FIG. 1 is a flow chart which details a portion of the steps, some of which are optional, that are employed in accordance with the present invention to isolate desirable components of the exhausted slurry. Specifically.

Referring generally to FIG. 1, in accordance with the present method the solid matter in the slurry is separated from the lubricating fluid. Any method for separating solids of a very small diameter (e.g., about 5 µm, 3 µm, 1 µm or even smaller) may be used. Preferably, the method employed will be one which yields lubricating fluid that is substantially free of solids (e.g., preferably less than about 1 g of solids per liter of lubricating fluid, more preferably less than about 0.5 g/liter and even more preferably less than about 0.3 g/liter). Filtration of the exhausted slurry, and more preferably press filtration, is an example of the method to employ to separate the solid matter from the lubricating fluid. Press filtration generally involves separating the exhausted slurry into a liquid fraction and a solids fraction by passing the exhausted slurry through at least one screen, such as a polypropylene screen, having a pore or mesh size which is sufficient to remove substantially all of the solids from the fluid at an elevated pressure. An exemplary press filtration device is the model de800/59pp manufactured by Diefenbach (Bergamo, Italy). The press filtration may be performed by passing about 300 to about 700 liters per hour of the exhausted slurry and preferably about 500 liters per hour of the exhausted slurry at a pressure of about 115 psi (about 0.8 MPa) to about 220 psi (about 1.5 MPa) and preferably at about 145 psi (about 1.0 MPa) to about 175 psi (about 1.2 MPa) through a screen having a pore or mesh size of less than about 5 µm, preferably less than about 3 µm, and more preferably less than about 1 µm.

Typically, filtration yields a "cake" of solids fraction comprising silicon particulate, metal particulate, spent abrasive grains, unspent abrasive grains and lubricating fluid (the concentration of lubricating fluid in the cake is typically less than about 25% by weight of the cake, preferably less than about 20%, more preferably less than about 15% and even more preferably less than about 10%). The solids fraction resulting from the separation is further processed, in order to isolate unspent abrasive grains from the silicon particulate, metal particulate and spent abrasive grains. Preferably, however, prior to separating the solids, and while in the filtering apparatus, the solids fraction is washed with a solvent (e.g., water or methanol, preferably water) to reduce the concentration of lubricating fluid. After being washed, the concentration of lubricating fluid in the cake is typically less than about 5% by weight of the cake, preferably less than about 2% and more preferably less than about 1%. The solvent and lubricating fluid washed from the solids fraction ("wash liquor") are preferably added to the previously separated liquid fraction prior to further processing of the liquid fraction.

The liquid fraction resulting from the separation is substantially free of solids and may be directly recycled into the silicon wafer manufacturing process, for use as the lubricating or cooling fluid of the silicon ingot slicing slurry without any additional separation or processing steps being performed. A residual amount of solid particles, up to about 0.5 grams/liter, typically remains in the liquid fraction. Typically, the residual solid particles are primarily silicon and are less than about 0.3 µm in diameter. However, if desired, an optional "clarification" step may be performed, wherein the fraction is subjected to an additional separation step to reduce the concentration of the residual solid particles. Any method for separating solids of about 0.1 µm or less may be used, preferably press filtration as described above. After clarification, the solids content of the liquid fraction is typically reduced below about 1 part per billion by weight.

As described above, the method of the present invention allows the liquid fraction to be recycled after separation or clarification. However, if the wash liquor is added to the liquid fraction, at least a portion of the solvent is preferably separated from the liquid fraction using evaporation or distillation. Preferably, the evaporation of the solvent is accomplished by heating the fraction. In the case of a liquid fraction comprising a "glycol"-based lubricating fluid, it is preferably heated to a temperature of about 50° C. to about 100° C., more preferably about 80° C. To enhance evaporation, the pressure to which the fraction is subject may be reduced, but atmospheric pressure is preferable so that the complexity and cost of the process is minimized. Evaporation increases the concentration of lubricating fluid in the fraction and is continued until the lubricating fluid reaches a viscosity suitable for the preparation of fresh slurry. For example, prior to concentration, a fraction comprising a "glycol"-based lubricating fluid and water typically has a viscosity of about 1 cps to about 2 cps at about 70° C. to about 90° C. and evaporation is continued until the viscosity of the fraction is about 10 cps to about 15 cps at about 70° C. to about 90° C. After cooling to about 25° C., the viscosity of the isolated lubricating fluid (i.e., the increased viscosity fraction) is preferably about 90 cps to about 120 cps and may used in the preparation of fresh slurry.

B. Segregation of Abrasive Grains and Silicon & Metal Particulate

The solids fraction separated from the exhausted slurry is further processed to isolate spent and unspent abrasive grains from silicon particulate and metal particulate. To facilitate the isolation of the abrasive grains, the solids fraction (cake) from the initial separation is mixed with at least one etchant to dissolve the silicon particulate and the metal particulate. For example, the solids fraction may be mixed with an etchant capable of dissolving both silicon particulate and metal particulate. One such etchant comprises hydrofluoric acid (HF) and nitric acid ($HNO_3$) typically in relatively high concentrations (e.g., HF and $HNO_3$ each typically comprise about 10 to about 20% by weight of the solution and preferably about 15% by weight of the solution). Highly concentrated HF-$HNO_3$ etchants, however, are hazardous and require extensive safety precautions. As such, the use of less hazardous etchants is preferred. Typically, this requires the use of an etchant to dissolve the silicon particulate and a different etchant to dissolve the metal particulate. The order in which the silicon and metal particulate are dissolved is not significant, however, the following discussion and the flow chart of FIG. 2 provide for the silicon particulate to be dissolved before the metal particulate.

1. Separation of the Silicon Particulate

Figure 2:
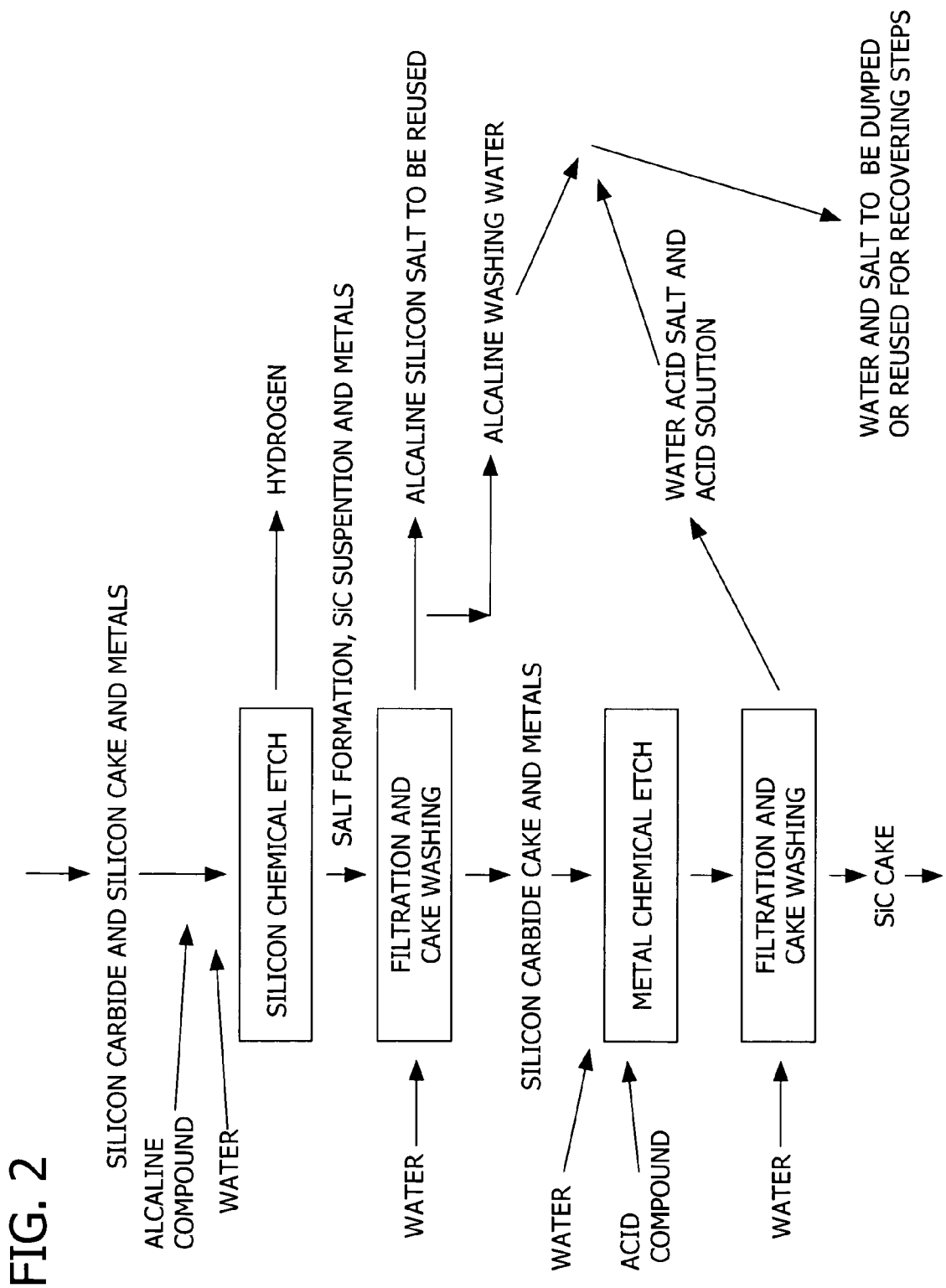
FIG. 2 is a flow chart which details a portion of the steps, some of which are optional, that are employed in accordance with the present invention to isolate desirable components of the exhausted slurry. Specifically.

Referring generally to FIG. 2, the solids fraction from the initial separation is mixed with an etchant to form a solid/etchant mixture in which silicon particulate is dissolved. Preferably, the etchant is an aqueous solution comprising an alkali metal hydroxide (e.g., NaOH and KOH) and/or an alkaline earth metal hydroxide (e.g., $Ca(OH)_2$). More preferably, the etchant is an aqueous solution comprising sodium hydroxide at a concentration of from about 6% to about 20% by weight, and more preferably from about 8% to about 15% by weight. Typically, at least about 6 liters of sodium hydroxide solution is added per kilogram of solids fraction, preferably at least about 7 liters, and more preferably at least about 8 liters. Most preferably, the amount of etchant added to the solid material is merely sufficient to dissolve essentially all of the silicon particulate.

The dissolution of silicon by a basic etchant results in the formation of a soluble alkali/alkaline earth silicon salt (e.g., $Na_2SiO_3$) and hydrogen gas. The hydrogen gas may be collected and used in other applications.

2. Separation of Solids from Etchants

Following the dissolution of silicon particulate, the remaining solid matter is separated from the etchant comprising the dissolved silicon particulate in the form of a soluble salt. Preferably, the solid/etchant mixture is passed through the press filter used previously to separate the solid fraction from the lubricating fluid thereby reducing the equipment costs associated with the present regeneration method. The cake of filtered solids comprises spent abrasive grains, unspent abrasive grains, metal particulate and a residual amount of etchant. If desired, the amount of etchant in the cake may be further reduced by diluting the cake with water and refiltering the mixture. Typically, after the dilution and filtration the concentration of the etchant in the cake is less than about 0.1% by weight.

3. Separation of the Metal Particulate

After separating the silicon particulate, the solids fraction is further processed to separate the unspent abrasive grains and the spent abrasive grains from the metal particulate by mixing the solids fraction with an etchant that dissolves the metal particulate. Preferably, the etchant is selected from the group consisting of an aqueous sulfuric acid solution, an aqueous nitric acid solution and mixtures thereof. More preferably, the etchant is an aqueous sulfuric acid solution. Preferably, the concentration of the sulfuric acid in etchant is from about 0.3% to about 1% by weight and more preferably from about 0.4% to about 0.8% be weight. Typically, at least about 6 liters of the sulfuric acid solution is added per kilogram of solids fraction, preferably at least about 7 liters, and more preferably at least about 8 liters. Most preferably, the amount of etchant added to the solid material is merely sufficient to dissolve essentially all of the metal particulate.

The metals dissolved with the acid solution form soluble salt compounds such as iron sulfates (e.g., $Fe_2(SO_4)_3$ and $FeSO_4$), copper sulfates and zinc sulfates which are filtered from the solids fraction as set forth above. The remaining solids fraction comprises spent abrasive grains and unspent abrasive grains. Any residual acidic etchant may be further reduced by diluting the cake with water and re-filtering the solids.

C. Segregation of Spent and Unspent Abrasive Grains

As discussed above, the slicing slurry typically becomes exhausted by metal or silicon particulate at a faster rate than by spent abrasive grains, thus, the segregation of spent and unspent abrasive grains need not be performed as often as the segregation metal and silicon particulate. Typically, the spent and unspent abrasive grains are separated when the concentration of spent abrasive grains exceeds about 5–10% by weight and preferably about 7% by weight of the total abrasive grains which corresponds to an approximate 1 to 2 μm shift in the particle size distribution of the abrasive grains.

The separation of spent and unspent abrasive grains can be performed at any point in the method of the present invention after segregation of the solids fraction (comprising spent and unspent abrasive grains and silicon and metal particulate) and the liquid fraction (comprising lubricating fluid). For example, the separation of spent and unspent abrasive grains may be performed prior to dissolving silicon particulate and metal particulate, after dissolving either silicon particulate or metal particulate, or after dissolving both silicon particulate and metal particulate. Preferably, the spent and unspent abrasive grains are separated after silicon particulate and metal particulate are dissolved.

The separation can be accomplished by any means common in the art which is capable of separating particles based on weight or size, such as, for example, a hydro-cyclone separator, a sedimentation centrifuge, a filtration centrifuge or a filter (in conjunction with a filter cloth having the appropriate pore size for the necessary selectivity). Preferably, this separation is accomplished by means of a hydro-cyclone separator, which is preferred due to its relatively low cost and durability (e.g., model number RWK810 by AKW of Germany).

Figure 3:
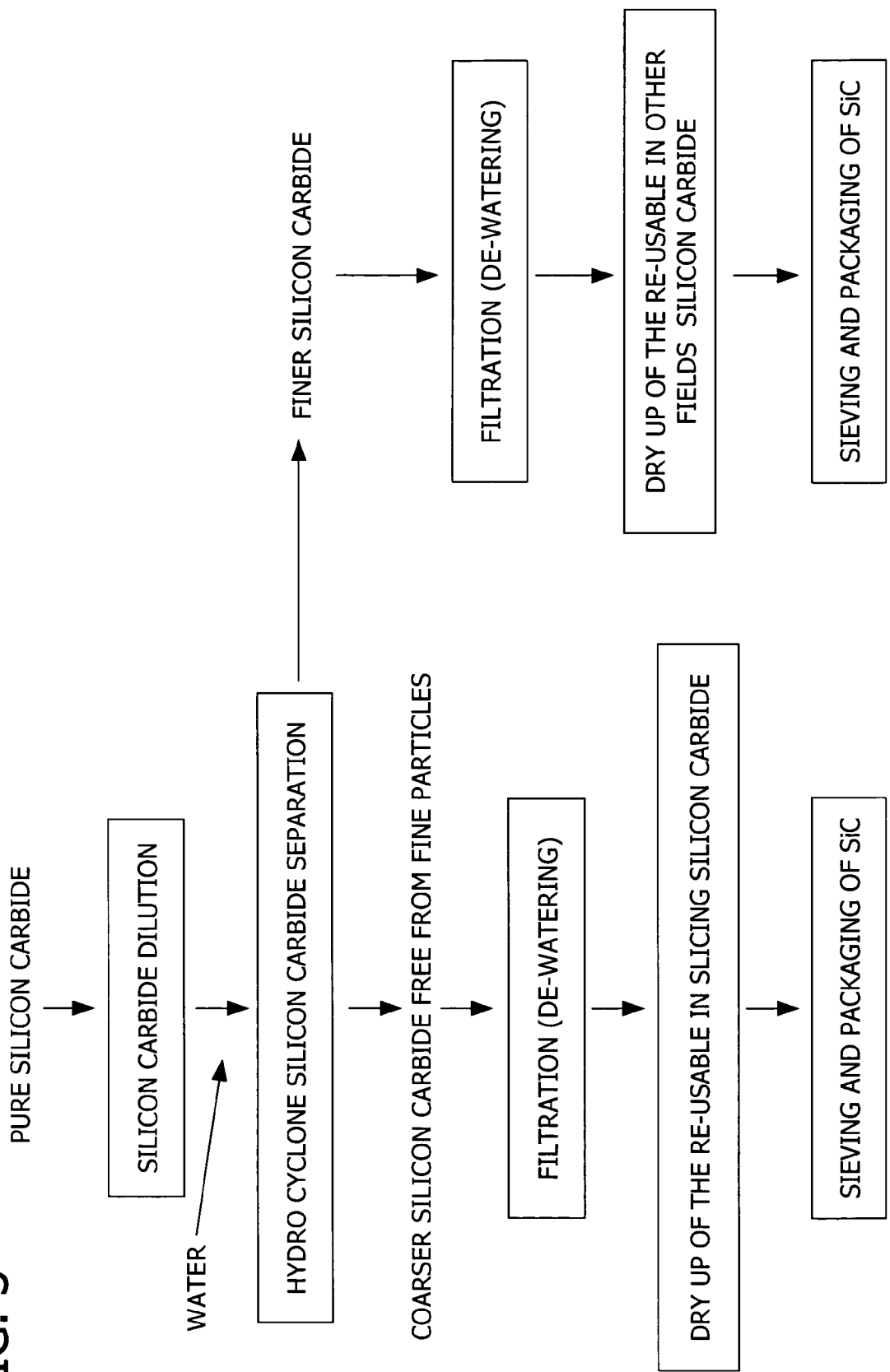
FIG. 3 is a flow chart which details a portion of the steps, some of which are optional, that are employed in accordance with the present invention to isolate desirable components of the exhausted slurry. Specifically.

Referring generally to FIG. 3, the remaining solids fraction (i.e., spent and unspent abrasive grains) are mixed with a liquid such as water, an acid etchant or a basic etchant to form an aqueous suspension (thus, the dissolution of the silicon and/or metal particulate may be incorporated with the separation of the unspent and spent abrasive grains). Preferably, water is mixed with the solids fraction and the concentration of solid particles is about 5 grams/liter to 100 grams/liter, preferably about 15 grams/liter to about 60 grams/liter, more preferably about 25 grams/liter to about 30 grams/liter. Generally speaking, in a hydro-cyclone separator, water and solid particles weighing less than a predetermined amount are discharged from an upper outlet while liquid and particles equal to or heavier than the predetermined weight are discharged from a lower outlet. In the present invention, the predetermined weight corresponds to particles of a size which allows separation of the unspent abrasive grains from the spent grains. Accordingly, after hydro-cyclone separation two suspensions remain—a recycle fraction comprising unspent abrasive grains and water and a waste fraction comprising spent abrasive grains and water.

If the separation of spent and unspent abrasive grains is performed before the silicon and/or metal particulate are separated, in addition to the spent abrasive grains, the waste fraction also comprises a significant portion of the silicon and metal particulate. This allows a significant reduction in the amount etchant(s) needed to separate any silicon and/or metal particulate remaining in the recycle fraction with the unspent abrasive grains, thereby reducing raw material costs.

D. Drying the Unspent Abrasive Grains

The liquid is removed from the recycle fraction to isolate the unspent abrasive grains for reuse in the wafer manufacturing process. The unspent abrasive grains may be isolated from the recycle fraction by means common in the art, such as by filtration or centrifugation. Preferably, a belt and vacuum filter or a filter press is used to remove the excess liquid. After the unspent abrasive grains are isolated from the first suspension, the grains may be reused to create fresh wire slicing slurry and the liquid (e.g., water) may be reused in the method of the present invention. Preferably, however, the unspent abrasive grains are dried by any means common in the art, such as by placing the filtered solids in an oven. It is preferable that the collected grains be periodically moved during the drying process due to the tendency of silicon carbide abrasive grains to form relatively large masses of solidified material.

It is to be noted that when heat is applied to dry the unspent abrasive grains it is preferable to use a temperature which will dry the solids as quickly and as efficiently as possible. Accordingly, preferably the abrasive grains will be dried at a temperature between about 75° C. and about 200° C., and more preferably between about 100° C. and about 150° C. Although the drying time may vary, depending upon, for example, the liquid being removed and the method of drying, typically drying will continue until only a trace amount, or less, of the liquid remains. For example, if water is used to form the solid/liquid mixture, typically the abrasive solids will be dried until the water content is less than about 5000 ppm (parts per million), preferably less than about 1000 ppm, and most preferably less than about 500 ppm, as determined by means common in the art (such as by the Karl Fischer method).

A low water content is desirable because the presence of water acts to decrease the viscosity of the slurry in which the recovered abrasive grains are used. Furthermore, the presence of water in the slurry can cause the abrasive grains, such as silicon carbide, to stick together, resulting in the formation of larger abrasive grains which can damage the surface of the wafer during the slicing process.

The waste fraction (i.e., the suspension containing the spent abrasive grains), may be discarded. Preferably, however, the waste fraction will be concentrated and the liquid, such as water, will be collected and reused in the method of the present invention to reduce the amount of waste generated. The suspended spent abrasive grains may optionally be collected and dried, as well.

In view of the above, it will be seen that the several objects of the invention are achieved and other advantageous results attained. It is intended that all matter contained in the above description shall be interpreted as illustrative and not in a limiting sense.

What is claimed is:

1. A method for treating an exhausted slurry utilized in slicing silicon wafers from a silicon ingot, the exhausted slurry comprising a lubricating fluid, unspent abrasive grains, spent abrasive grains, silicon particulate and metal particulate, the method comprising:

(a) separating the exhausted slurry into a first liquid fraction and a first solids fraction, the first liquid fraction comprising lubricating fluid, the first solids fraction comprising unspent abrasive grains, spent abrasive grains, silicon particulate and metal particulate; and (b) mixing the first solids fraction with a first etchant to form a first solid/etchant mixture in which at least one of the group consisting of silicon particulate and metal particulate is dissolved.

2. The method as set forth in claim 1 wherein step (a) is conducted in a manner such that the first liquid fraction is suitable for direct incorporation into a fresh slurry.

3. The process as set forth in claim 1 wherein the lubricating fluid is polyethylene glycol.

4. The method as set forth in claim 1 wherein the first solids fraction comprises lubricating fluid and the method further comprises washing the first solids fraction with a solvent to reduce the concentration of lubricating fluid in the first solids fraction and form a wash liquor comprising solvent and lubricating fluid.

5. The method as set forth in claim 4 wherein the solvent is selected from the group consisting of water and methanol.

6. The method as set forth in claim 4 wherein the solvent is water.

7. The method as set forth in claim 4 further comprising adding the wash liquor to the first liquid fraction to form a wash liquor/liquid fraction mixture and heating the wash liquor/liquid fraction mixture to a temperature of from about 50° C. to about 100° C. to evaporate solvent from the wash liquor/liquid fraction mixture.

8. The method as set forth in claim 1 wherein the first etchant dissolves silicon particulate and metal particulate, the method further comprising:

(c) separating the first solid/etchant mixture into a second liquid fraction and a second solids fraction, the second liquid fraction comprising the first etchant and dissolved silicon particulate and dissolved metal particulate, the second solids fraction comprising unspent abrasive grains and spent abrasive grains;

(d) mixing the second solids fraction with water to form an aqueous suspension comprising unspent abrasive grains and spent abrasive grains;

(e) separating the aqueous suspension into a recycle fraction and waste fraction, the recycle fraction comprising unspent abrasive grains and water, the waste fraction comprising spent abrasive grains and water; and (f) separating the recycle fraction into a liquid fraction comprising water and isolated unspent abrasive grains.

9. The method as set forth in claim 8 wherein the aqueous suspension is separated into the recycle fraction and the waste fraction using a cyclone separator.

10. The method as set forth in claim 8 further comprising drying the isolated unspent abrasive grains until the residual water content is less than about 1000 ppm.

11. The method as set forth in claim 8 wherein the first etchant comprises a mixture of hydrofluoric acid and nitric acid.

12. The method as set forth in claim 11 wherein the concentration of the hydrofluoric acid and the concentration of the nitric acid in the first etchant are both from about 10 to about 20 percent by weight.

13. The method as set forth in claim 11 wherein the concentration of the hydrofluoric acid and the concentration of the nitric acid in the first etchant are both about 15 percent by weight.

14. The method as set forth in claim 12 wherein at least about 6 liters of the first etchant is mixed per kilogram of the first solids fraction.

15. The method as set forth in claim 1 wherein the first etchant dissolves silicon particulate or metal particulate in the first solid/etchant mixture, the method further comprising:
- (c) separating the first solid/etchant mixture into a second liquid fraction and a second solids fraction, the second liquid fraction comprising the first etchant and dissolved silicon particulate or dissolved metal particulate, the second solids fraction comprising unspent abrasive grains, spent abrasive grains and silicon particulate or metal particulate not dissolved in the first etchant;
- (d) mixing the second solids fraction with a second etchant to form a second solid/etchant mixture in which silicon particulate or metal particulate not dissolved in the first solid/etchant mixture is dissolved; and
- (e) separating the second solid/etchant mixture into a third liquid fraction and a third solids fraction, the third liquid fraction comprising the second etchant and dissolved silicon particulate or dissolved metal particulate, the third solids fraction comprising unspent abrasive grains and spent abrasive grains;
- (f) mixing the third solids fraction with water to form an aqueous suspension comprising unspent abrasive grains and spent abrasive grains;
- (g) separating the aqueous suspension into a recycle fraction and waste fraction, the recycle fraction comprising unspent abrasive grains and water, the waste fraction comprising spent abrasive grains and water; and
- (h) separating the recycle fraction into a suspending fraction comprising water and isolated unspent abrasive grains.

16. The method as set forth in claim 15 wherein the aqueous suspension is separated into the recycle fraction and the waste fraction using a cyclone separator.

17. The method as set forth in claim 15 further comprising drying the isolated unspent abrasive grains until the residual water content is less than about 1000 ppm.

18. The method as set forth in claim 15 wherein the first etchant dissolves silicon particulate in the first solid/etchant mixture, the first etchant comprises water and a base selected from the group consisting of an alkali metal hydroxide and an alkaline earth metal hydroxide, and the second liquid fraction comprises the first etchant and dissolved silicon particulate.

19. The method as set forth in claim 18 wherein the base is sodium hydroxide.

20. The method as set forth in claim 19 wherein the concentration of sodium hydroxide in the first etchant is from about 6 to about 20 percent by weight.

21. The method as set forth in claim 19 wherein the concentration of sodium hydroxide in the first etchant is from about 8 to about 15 percent by weight.

22. The method as set forth in claim 20 wherein at least about 6 liters of the first etchant is mixed per kilogram of the first solids fraction.

23. The process as set forth in claim 18 further comprising collecting hydrogen gas evolved during the dissolution of silicon particulate in the first solid/etchant mixture.

24. The method as set forth in claim 15 wherein the second etchant dissolves metal particulate not dissolved in the first solid/etchant mixture, the second etchant comprises water and an acid selected from the group consisting of nitric acid and sulfuric acid, and the second liquid fraction comprises the first etchant and dissolved metal particulate.

25. The method as set forth in claim 24 wherein the acid is sulfuric acid.

26. The method as set forth in claim 25 wherein the concentration of sulfuric acid in the first etchant is from about 0.3 to about 1 percent by weight.

27. The method as set forth in claim 25 wherein the concentration of sulfuric acid in the first etchant is from about 0.4 to about 0.8 percent by weight.

28. A method for treating an exhausted slurry utilized in slicing silicon wafers from a silicon ingot, the exhausted slurry comprising a lubricating fluid, unspent abrasive grains, spent abrasive grains, silicon particulate and metal particulate, the method comprising:
- (a) separating the exhausted slurry into a first liquid fraction and a first solids fraction, the first liquid fraction comprising lubricating fluid suitable, the first solids fraction comprising unspent abrasive grains, spent abrasive grains, silicon particulate and metal particulate;
- (b) mixing the first solids fraction with water to form an aqueous suspension comprising unspent abrasive grains, spent abrasive grains, silicon particulate and metal particulate;
- (c) separating the aqueous suspension into a recycle fraction and waste fraction, the recycle fraction comprising unspent abrasive grains, silicon particulate, metal particulate, the waste fraction comprising spent abrasive grains, silicon particulate, metal particulate and water;
- (d) mixing the recycle fraction with a first etchant to form a first solid/etchant mixture in which the silicon particulate or the metal particulate is dissolved;
- (e) separating the first solid/etchant mixture into a second liquid fraction and a second solids fraction, the second liquid fraction comprising the first etchant and dissolved silicon particulate or dissolved metal particulate, the second solids fraction comprising unspent abrasive grains and silicon particulate or metal particulate not dissolved in the first etchant;
- (f) mixing the second solids fraction with a second etchant to form a second solid/etchant mixture in which the silicon particulate or the metal particulate not dissolved in the first solid/etchant mixture is dissolved; and
- (g) separating the second solid/etchant mixture into a third liquid fraction and a third solids fraction, the third liquid fraction comprising the second etchant and dissolved silicon particulate or dissolved metal particulate, the third solids fraction comprising unspent abrasive grains.

29. A method for treating an exhausted slurry utilized in slicing silicon wafers from a silicon ingot, the exhausted slurry comprising a lubricating fluid, unspent abrasive grains, spent abrasive grains, silicon particulate and metal particulate, the method comprising:
- (a) separating the exhausted slurry into a first liquid fraction and a first solids fraction, the first liquid fraction comprising lubricating fluid, the first solids fraction comprising unspent abrasive grains, spent abrasive grains, silicon particulate, metal particulate and lubricating fluid;
- (b) washing the first solids fraction with a solvent to reduce the concentration of lubricating fluid in the first solids fraction and form a wash liquor comprising solvent and lubricating fluid;
- (c) adding the wash liquor to the first liquid fraction to form a wash liquor/liquid fraction mixture and heating the wash liquor/liquid fraction mixture to a temperature of from about 50° C. to about 100° C. to evaporate solvent from the wash liquor/liquid fraction mixture;

(d) mixing the washed first solids fraction with an aqueous sodium hydroxide solution to form a first solid/etchant mixture in which silicon particulate is dissolved;

(e) separating the first solid/etchant mixture into a second liquid fraction and a second solids fraction, the second liquid fraction comprising the aqueous sodium hydroxide solution and dissolved silicon particulate; the second solids fraction comprising unspent abrasive grains, spent abrasive grains and metal particulate;

(f) mixing the second solids fraction with an aqueous sulfuric acid solution to form a second solid/etchant mixture in which the metal particulate is dissolved;

(g) separating the second solid/etchant mixture into a third liquid fraction and a third solids fraction, the third liquid fraction comprising the aqueous sulfuric acid solution and dissolved metal particulate, the third solids fraction comprising unspent abrasive grains and spent abrasive grains;

(h) rinsing the third solids fraction with water; and (i) drying the third solids fraction until the residual water content is less than about 1000 ppm.

30. The method as set forth in claim 29 wherein the third solids fraction comprises less than about 7 percent by weight of spent abrasive grains.

31. A method for treating an exhausted slurry utilized in slicing silicon wafers from a silicon ingot, the exhausted slurry comprising a lubricating fluid, unspent abrasive grains, spent abrasive grains, silicon particulate and metal particulate, the method comprising:

(a) separating the exhausted slurry into a first liquid fraction and a first solids fraction, the first liquid fraction comprising lubricating fluid, the first solids fraction comprising unspent abrasive grains, spent abrasive grains, silicon particulate, metal particulate and lubricating fluid;

(b) washing the first solids fraction with a solvent to reduce the concentration of lubricating fluid in the first solids fraction and form a wash liquor comprising solvent and lubricating fluid;

(c) adding the wash liquor to the first liquid fraction to form a wash liquor/liquid fraction mixture and heating the wash liquor/liquid fraction mixture to a temperature of from about 50° C. to about 100° C. to evaporate solvent from the wash liquor/liquid fraction mixture;

(d) mixing the washed first solids fraction with an aqueous sodium hydroxide solution to form a first solid/etchant mixture in which silicon particulate is dissolved;

(e) separating the first solid/etchant mixture into a second liquid fraction and a second solids fraction, the second liquid fraction comprising the aqueous sodium hydroxide solution and dissolved silicon particulate; the second solids fraction comprising unspent abrasive grains, spent abrasive grains and metal particulate;

(f) mixing the second solids fraction with an aqueous sulfuric acid solution to form a second solid/etchant mixture in which metal particulate is dissolved;

(g) separating the second solid/etchant mixture into a third liquid fraction and a third solids fraction, the third liquid fraction comprising the aqueous sulfuric acid solution and dissolved metal particulate, the third solids fraction comprising unspent abrasive grains and spent abrasive grains;

(h) mixing the third solids fraction with water to form an aqueous suspension comprising unspent abrasive grains and spent abrasive grains;

(i) separating the aqueous suspension into a recycle fraction and waste fraction, the recycle fraction comprising unspent abrasive grains and water, the waste fraction comprising spent abrasive grains and water; and (j) separating the recycle fraction into a suspending liquid fraction comprising water and isolated unspent abrasive grains; and (k) drying the isolated unspent abrasive grains until the residual water content is less than about 1000 ppm.

* * * * *